(12) United States Patent
Hiroki

(10) Patent No.: US 7,937,613 B2
(45) Date of Patent: May 3, 2011

(54) CENTRAL PROCESSING APPARATUS

(75) Inventor: Masahide Hiroki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 258 days.

(21) Appl. No.: 12/180,964

(22) Filed: Jul. 28, 2008

(65) Prior Publication Data

US 2008/0294809 A1 Nov. 27, 2008

Related U.S. Application Data

(63) Continuation of application No. PCT/JP2006/303164, filed on Feb. 22, 2006.

(51) Int. Cl.
G06F 11/00 (2006.01)

(52) U.S. Cl. ............... 714/5; 714/25; 714/43; 714/48; 714/704

(58) Field of Classification Search ............. 714/4, 25, 714/43; 709/213
See application file for complete search history.

(56) References Cited

U.S. PATENT DOCUMENTS

| | | | |
|---|---|---|---|
| 5,452,454 A * | 9/1995 | Basu ............................ 713/2 |
| 5,577,210 A * | 11/1996 | Abdous et al. ................ 709/219 |
| 5,790,775 A | 8/1998 | Marks et al. |
| 5,842,011 A * | 11/1998 | Basu ............................ 713/2 |
| 6,317,826 B1 * | 11/2001 | McCall et al. ................ 713/1 |
| 6,421,777 B1 * | 7/2002 | Pierre-Louis et al. ......... 713/2 |
| 6,748,525 B1 * | 6/2004 | Hubacher et al. ............. 713/1 |
| 6,763,479 B1 * | 7/2004 | Hebert ........................ 714/4 |
| 6,795,934 B2 * | 9/2004 | Nagata et al. ................ 714/8 |
| 7,246,262 B2 * | 7/2007 | Nagata et al. ................ 714/8 |
| 7,251,725 B2 * | 7/2007 | Loison et al. ................ 713/1 |
| 7,406,617 B1 * | 7/2008 | Athreya et al. .............. 714/4 |
| 7,437,545 B2 * | 10/2008 | Haustein et al. ............. 713/1 |
| 7,464,291 B2 * | 12/2008 | Nagata et al. ................ 714/8 |
| 7,487,343 B1 * | 2/2009 | Insley et al. ................. 713/1 |
| 7,664,834 B2 * | 2/2010 | Keith, Jr. ................... 709/220 |
| 2003/0018756 A1 * | 1/2003 | Nguyen et al. .............. 709/220 |
| 2005/0010843 A1 * | 1/2005 | Iwamitsu et al. ............ 714/724 |
| 2005/0223266 A1 * | 10/2005 | Iwamitsu et al. ............ 714/5 |
| 2005/0278581 A1 * | 12/2005 | Jiang et al. ................. 714/40 |
| 2006/0107030 A1 * | 5/2006 | Biondi et al. ............... 713/2 |
| 2006/0112304 A1 * | 5/2006 | Subramanian et al. ....... 714/6 |

(Continued)

FOREIGN PATENT DOCUMENTS

JP A 64-44562 2/1989

(Continued)

OTHER PUBLICATIONS

Extended Supplementary European Search Report dated Nov. 3, 2010 for corresponding European Application No. 06714304.0.

(Continued)

*Primary Examiner* — Bryce P Bonzo
*Assistant Examiner* — Jeison C Arcos
(74) *Attorney, Agent, or Firm* — Fujitsu Patent Center

(57) ABSTRACT

A server apparatus controls an FC card α so as to access a disk array apparatus A. The FC card α obtains response information sent from the disk array apparatus A in accordance with the present access. If the response information is a predefined specific access error in this event, the server apparatus controls the FC card α so as to change the address of the present access to that of a disk array apparatus B that is different from the sender of the present response information, and then access the present post-change address.

10 Claims, 9 Drawing Sheets

U.S. PATENT DOCUMENTS

| | | | |
|---|---|---|---|
| 2007/0047536 A1* | 3/2007 | Scherer et al. | 370/360 |
| 2007/0055853 A1* | 3/2007 | Hatasaki et al. | 713/1 |
| 2007/0188507 A1* | 8/2007 | Mannen et al. | 345/532 |
| 2009/0103430 A1* | 4/2009 | Wang | 370/221 |

FOREIGN PATENT DOCUMENTS

| | | |
|---|---|---|
| JP | A 64-59552 | 3/1989 |

OTHER PUBLICATIONS

Synchronizing Data on a Mirrored IMPL Disk Unit, IBM Technical Disclosure Bulletin, International Business Machines Corp. (Thornwood), US, vol. 33, No. 6A, XP000107623, ISSN: 0018-8689, pp. 29-34, Nov. 1, 1990.

\* cited by examiner

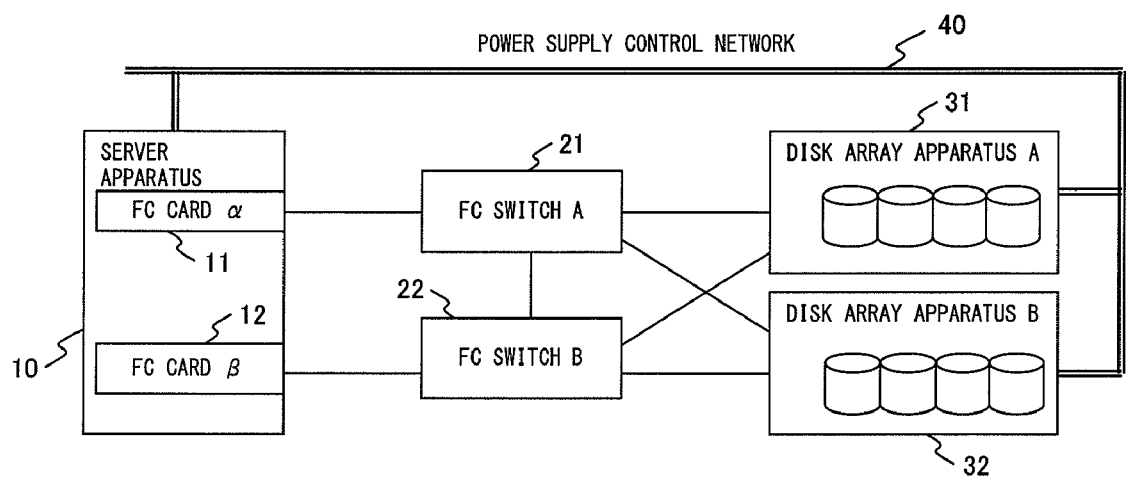
F I G. 2

| PRIORITY | CARD INFORMATION | TARGET IDENTIFIER | FC INTERFACE-SPECIFIC INFORMATION OF DISK ARRAY APPARATUS | STARTUP WAITING TIME | PATH INFORMATION |
|---|---|---|---|---|---|
| 1 | CARD α | 0 | 0x50000000 0e000001 (DISK ARRAY A) | 10 MINUTES | A |
| 3 | CARD α | 1 | 0x50000000 0e000002 (DISK ARRAY B) | 20 MINUTES | A |
| 2 | CARD β | 0 | 0x50000000 0e000001 (DISK ARRAY A) | 10 MINUTES | B |
| 4 | CARD β | 1 | 0x50000000 0e000002 (DISK ARRAY B) | 20 MINUTES | B |

F I G. 5

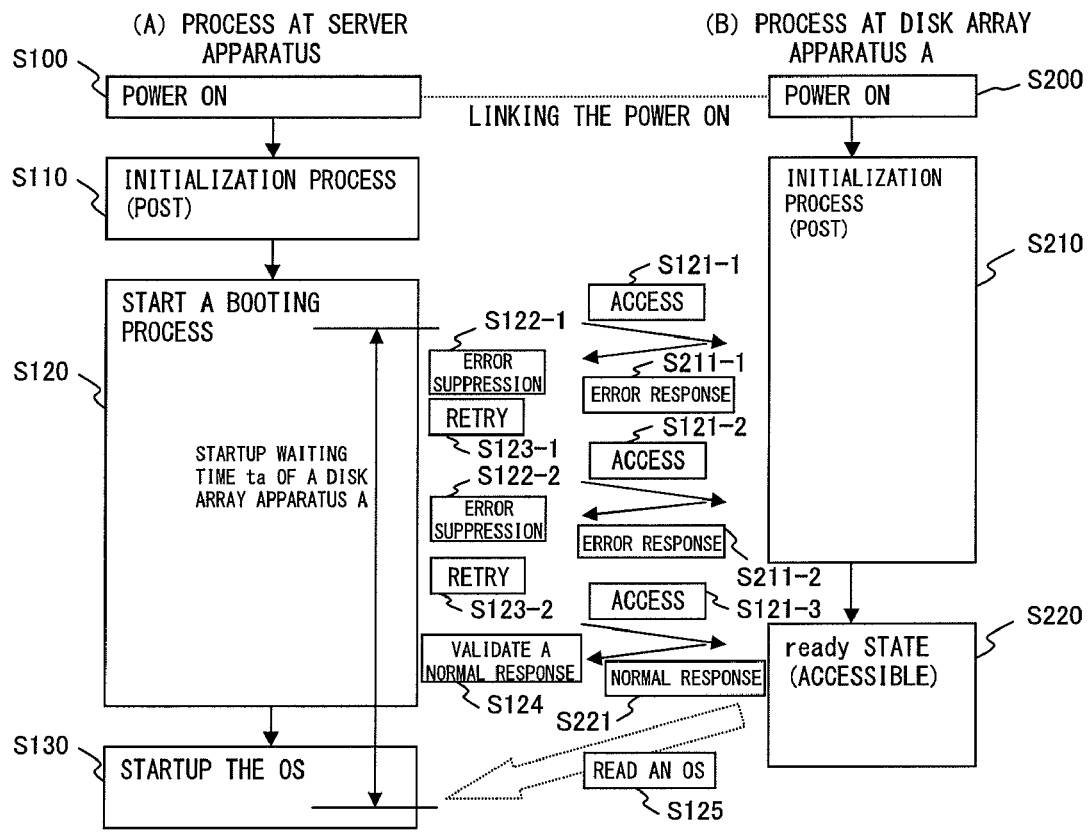
F I G. 6

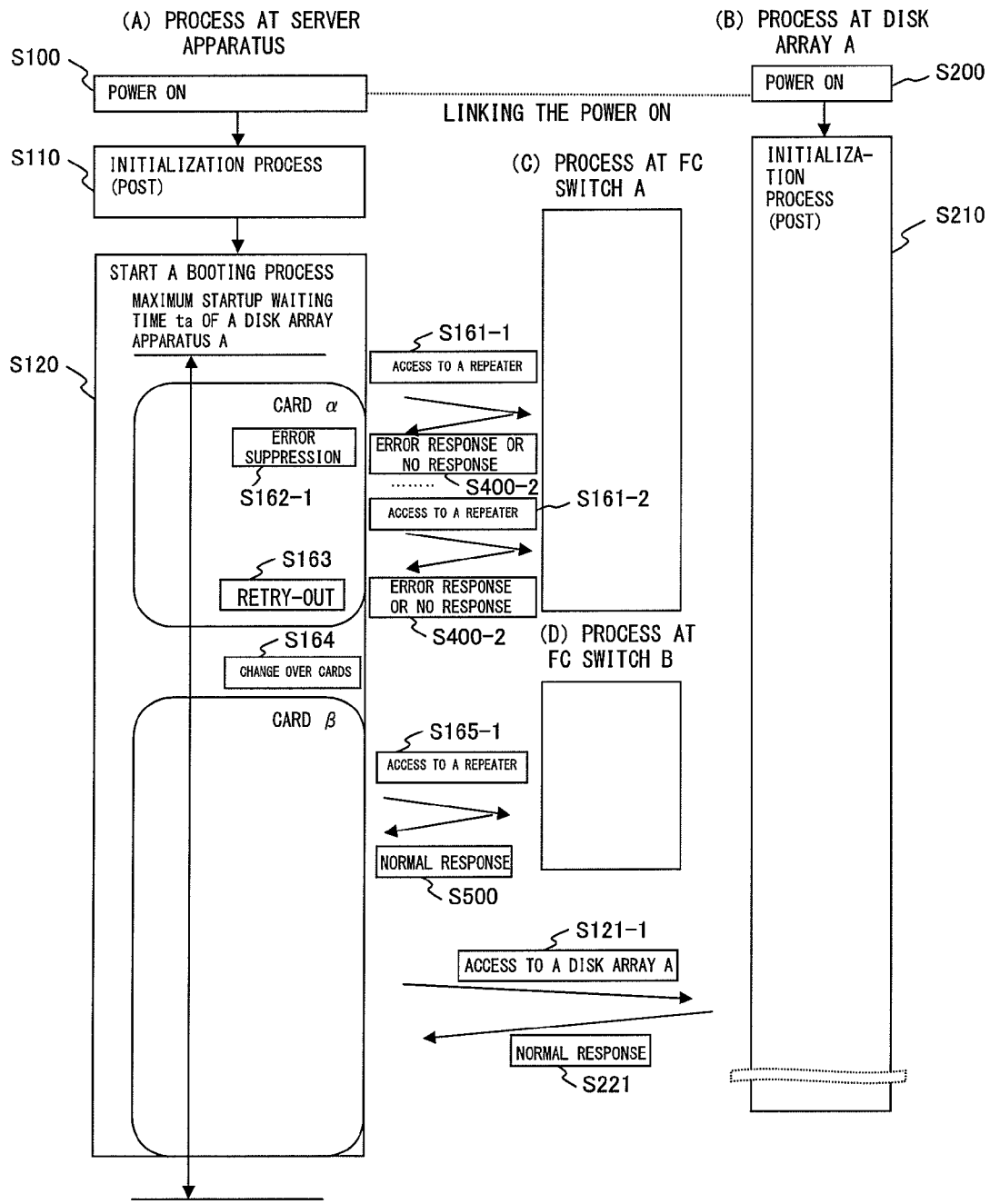
F I G. 9

CENTRAL PROCESSING APPARATUS

CROSS REFERENCE TO RELATED APPLICATION

This application is a continuation application of international PCT application No. PCT/JP2006/303164 filed on Feb. 22, 2006.

BACKGROUND OF THE INVENTION

1. Field of the Invention

The present invention relates to an information processing technique and in particular to a technique for performing a concerted operation between a central processing apparatus and peripheral apparatuses which constitute a computer system.

2. Description of the Related Art

The function of turning on/off, in a lump, the power supply of a server apparatus (i.e., a central processing apparatus) existing in an environment and the power supplies of a plurality of peripheral apparatuses (e.g., a disk array apparatus (es), a network relay device(s), a tape apparatus(es) and such) is increasingly important in terms of preventing mistakes in maintenance, such as forgetting to turn the power on or off, when carrying out maintenance in a large scale computer system environment. For that purpose, a server apparatus and individual peripheral apparatuses have conventionally been connected together by way of a network structured using a communication interface for use in a computer system such as a Remote Cabinet Interface (RCI), and by implementing the function of turning the power on/off of the entirety of apparatuses existing in the environment.

Incidentally, in a computer system storing a system volume (i.e., an operating system (OS) image) used for starting up a server apparatus in a disk array apparatus as one of the peripheral apparatuses, the disk array apparatus needs to be ready to be accessed at the start-up of the server apparatus. The above described power supply linkage function can certainly be implemented even in such an environment by utilizing the above described inter-apparatus network. In this case, however, there is a difference in the length of startup time between the server apparatus and disk array apparatus, and therefore it is necessary to wait for the other's startup time between the server apparatus and disk array apparatus.

One method of performing a waiting function at a server apparatus is a method of delaying the start of a booting process for a preset time period at all times after the completion of a power-on self test (POST) process. The following is a description of the method, referring to FIG. 1.

FIG. 1 shows how a process progresses when starting the above described computer system by using the above described method. Referring to FIG. 1, process (A) shows the progress of the process at the server apparatus, while process (B) shows the progress of the process at the disk array apparatus.

When turning on the power supply of the computer system in a lump, the power is turned on to the server apparatus in S1000 and, in concert with this, the power is also turned on to the disk array apparatus in S2000. This prompts the execution of an initialization process for the server apparatus to start in S1010 and, in parallel, the execution of an initialization process for the disk array apparatus to start in S2010.

Then, the execution of the initialization process is temporarily interrupted at the server apparatus and the starting of the disk array apparatus is delayed until the time t0. Meanwhile, the disk array apparatus completes the execution of the initialization process, shifts the process to S2020 and enters into a ready state (i.e., being ready to receive an access from the server apparatus), while the server apparatus interrupts the execution of the initialization process.

The server apparatus interrupts the execution only for a preset period of time, then completes the execution of the initialization process to shift the process to S1020 and starts the execution of a booting process. Then the server apparatus accesses the disk array apparatus for reading an OS in S1021 of the booting process. The disk array apparatus is already in a ready state at this time and therefore returns, to the server apparatus, a normal response to the access thereof and also sends the OS image in S2021.

The server apparatus reads the OS image sent from the disk array apparatus in S1022. When completing the reading, the server apparatus completes the execution of the booting process, shifts the process to S1030, and perform the startup process for the OS. This completes the series of steps of the startup process.

In the meantime, relating to the above described technique, Laid-Open Japanese Patent Application Publication No. Sho 64-44562 has disclosed a technique in which a service processor instructs a central processing apparatus to run an initiation program loading routine and then sets a certain period of time if the state of an input/output apparatus indicates a not-ready state and again instructs the central processing apparatus to run the initiation program loading routine if it is within the certain period of time.

The above described method for a server apparatus comprised in a computer system to wait for the startup of a disk array apparatus is faced with problems in terms of the following:

(1) A delay time is set under the assumption of a worst case scenario, and therefore a delay of a certain period of time always occurs even if the startup of the disk array apparatus is performed faster. For example, a disk array apparatus usually starts up in about five minutes; it may take about twenty minutes in the worst case if an error is detected in the initialization process.

(2) A server apparatus also needs a certain period of time at all times for detecting an error in a disk array apparatus.

(3) Since a server apparatus waits in the midst of an initialization process as described above, it needs to wait for a starting of work for a preset period of time even if only the maintenance (e.g., work to change setups of various parameters for a server apparatus) of a computer system is required after the completion of the initialization process for the server apparatus.

(4) If a computer system comprises a plurality of disk array apparatuses with the lengths of their startup times being respectively different, it is necessary to set the startup waiting time on the basis of the time required in the worst case.

SUMMARY OF THE INVENTION

According to one aspect of the present invention, a central processing apparatus for use in a computer system that comprises the present central processing apparatus and a plurality of external storage apparatuses comprises: an access unit for accessing a specific target among the external storage apparatuses in order to read an operating system; a response information obtainment unit for obtaining response information sent from the external storage apparatus in response to the access; and an access control unit for changing the address of the access to that of an external storage apparatus that is different from the sender of response information by controlling the access unit and then making the access unit access the present post-change address if the present response information obtained from the response information obtainment unit is a predefined specific access error.

Further, also according to the present invention is a booting method for a central processing apparatus for use in a computer system which comprises the present central processing apparatus and a plurality of external storage apparatuses, comprising: accessing a specific external storage apparatus from among the external storage apparatuses in order to read an operating system; obtaining response information sent from the external storage apparatus in accordance with the access; and changing the address of the access to that of an external storage apparatus that is different from the sender of response information and then making the access to the present post-change external storage apparatus if the obtained present response information is a predefined specific access error.

Further, also according to the present invention is a storage medium for storing a program for booting a central processing apparatus for use in a computer system that comprises the present central processing apparatus and a plurality of external storage apparatuses, wherein the program makes the present central processing apparatus execute the processing of accessing a specific external storage apparatus from among the external storage apparatuses in order to read an operating system (OS); obtaining response information sent from the external storage apparatus in accordance with the access; and changing the address of the access to that of an external storage apparatus that is different from the sender of response information and then achieving access to the present post-change external storage apparatus if the present response information obtained by executing the processing for obtaining the response information is a predefined specific access error.

BRIEF DESCRIPTION OF THE DRAWINGS

The present invention will be more apparent from the following detailed description when the accompanying drawings are referenced.

FIG. 2 is a diagram showing the configuration of a computer system embodying the present invention;

FIG. 5 is a diagram exemplifying a boot changeover priority table;

FIG. 6 is a diagram showing a first example of how the process at the startup of the computer system shown in FIG. 2 progresses;

FIG. 9 is a diagram showing a fourth example of how the process at the startup of the computer system shown in FIG. 2 progresses.

DESCRIPTION OF THE PREFERRED EMBODIMENTS

The following is a description of the preferred embodiment of the present invention by referring to the accompanying drawings.

To begin with, a description is provided for FIG. 2, which shows the configuration of a computer system embodying the present invention.

The configuration of the computer system shown in FIG. 2 equips a server 10, that is, a central processing apparatus, with a fibre channel (FC) card α11 and an FC card β12. These cards are connected to disk array apparatuses A31 and B32 by way of FC switches A21 and B22, and a storage area network (SAN) of a fibre channel system is constituted by the central processing apparatus and a plurality of external storage apparatuses.

Each of the disk array apparatuses A31 and B32 stores the image of an operating system (OS) for starting the server apparatus 10.

Note that the server apparatus 10, and disk array apparatuses A31 and B32 are respectively connected to a power supply control network 40 utilizing a Remote Cabinet Interface (RCI) so as to link the power on/off.

Figure 1:
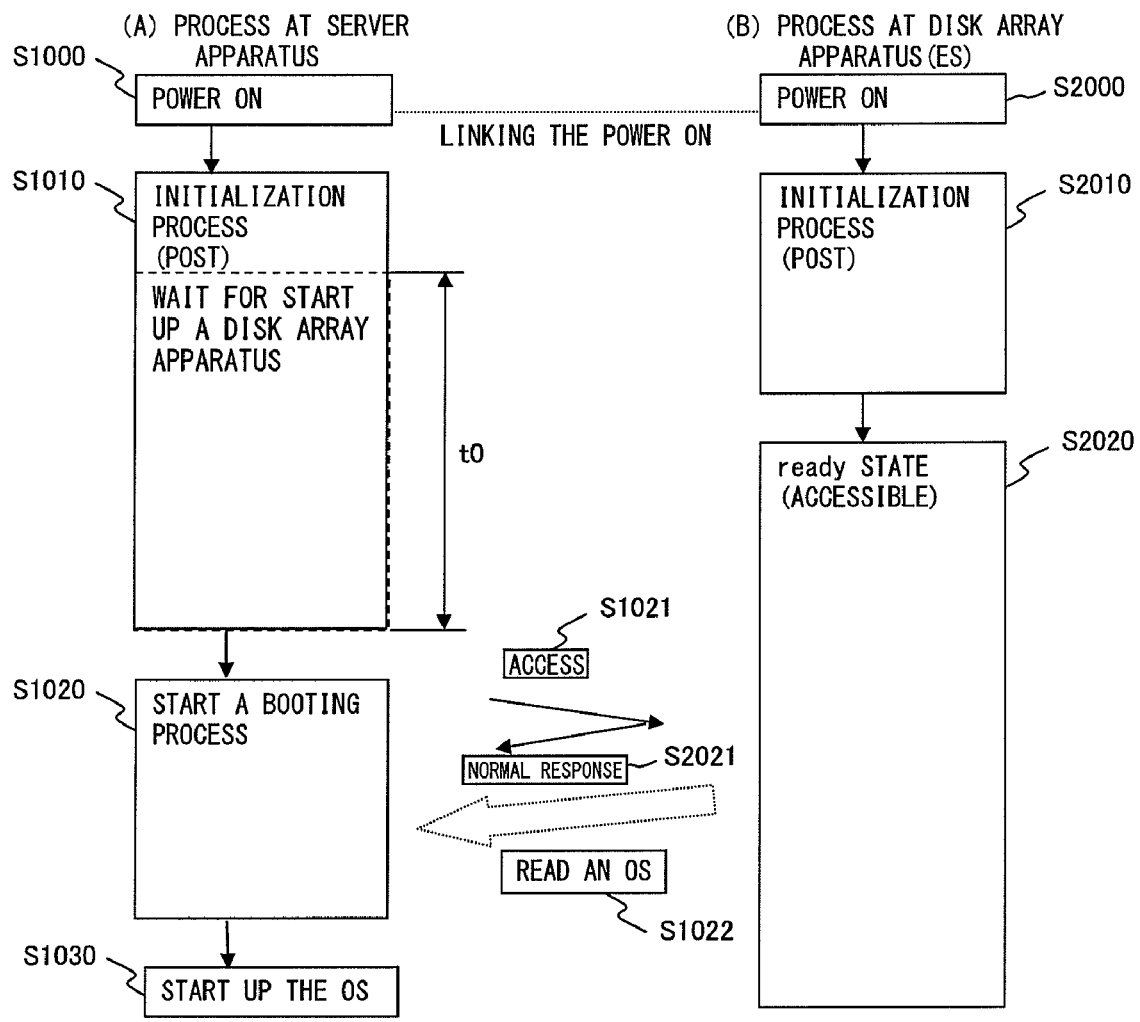
FIG. 1 is a diagram showing how a conventional process progresses when starting a computer system.
Figure 3:
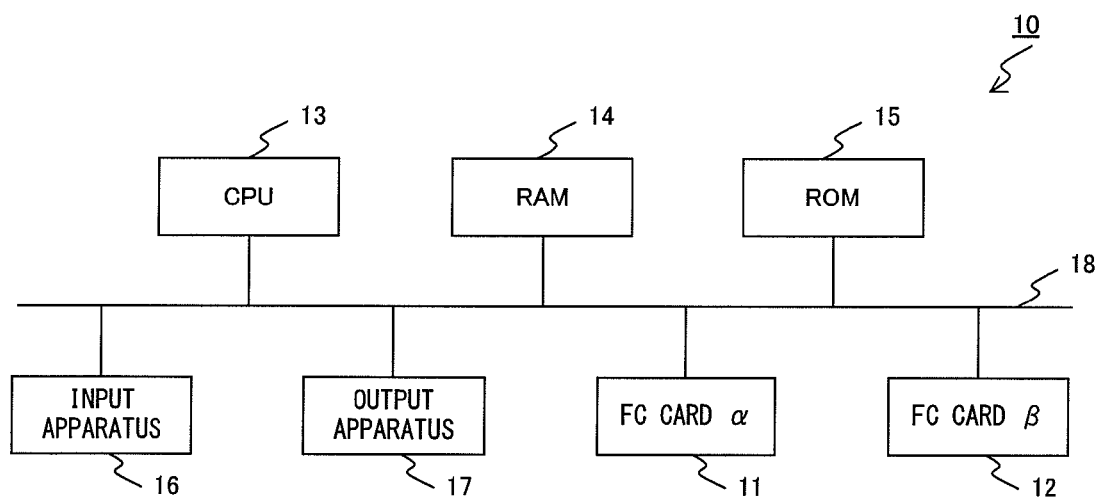
FIG. 3 is a diagram showing the configuration of the server apparatus shown in FIG. 2.

FIG. 3 is a diagram showing the configuration of the server apparatus 10 shown in FIG. 2. Referring to FIG. 3, the fibre channel (FC) card α11, FC card β12, a central processing unit (CPU) 13, random access memory (RAM) 14, read-only memory (ROM) 15, an input apparatus 16 and an output apparatus 17 are interconnected by a bus 18 so as to enable the mutual exchanges of various pieces of data under the management of the CPU 13.

The CPU 13 is an arithmetic logical operation device for performing various controls processing by executing a program or programs.

The RAM 14 is used as a work-use storage area, or a temporary storage area for various pieces of data, when the CPU 13 executes a program.

The ROM 15 is a recording medium pre-recording a program(s) (i.e., firmware) for making the CPU 13 carry out control processes such as the initialization processes of individual units of hardware constituting the server apparatus 10, the booting process of the server apparatus 10, a process when the booting fails, and like processes. These processes are described in detail later.

In order to store the above described program(s) (i.e., firmware) in the ROM 15, the configuration may be such a configuration as to record the present program in a portable recording medium, for example, CD-ROM, DVD-ROM and the like, and then store the program in the ROM 15 (e.g., flash memory) by making the server apparatus 10 read it from such a recording medium. Another example configuration may be such a configuration as to generate a transmission signal by modulating a carrier wave with a data signal expressing the present program, to transmit it by way of a telecommunication line such as the Internet, and to store it in the ROM 15 (e.g., flash memory) by making the server apparatus 10 receive the present transmission signal and demodulate it to the original program.

The input apparatus 16, being a key board, a mouse or the like, is disposed to hand, to the CPU 13, an input corresponding to the operation by an administrator of the server apparatus or the like.

The output apparatus 17, being a display apparatus or the like, is disposed to output various pieces of data and present the administrator of the server apparatus or the like with the data.

Figure 4:
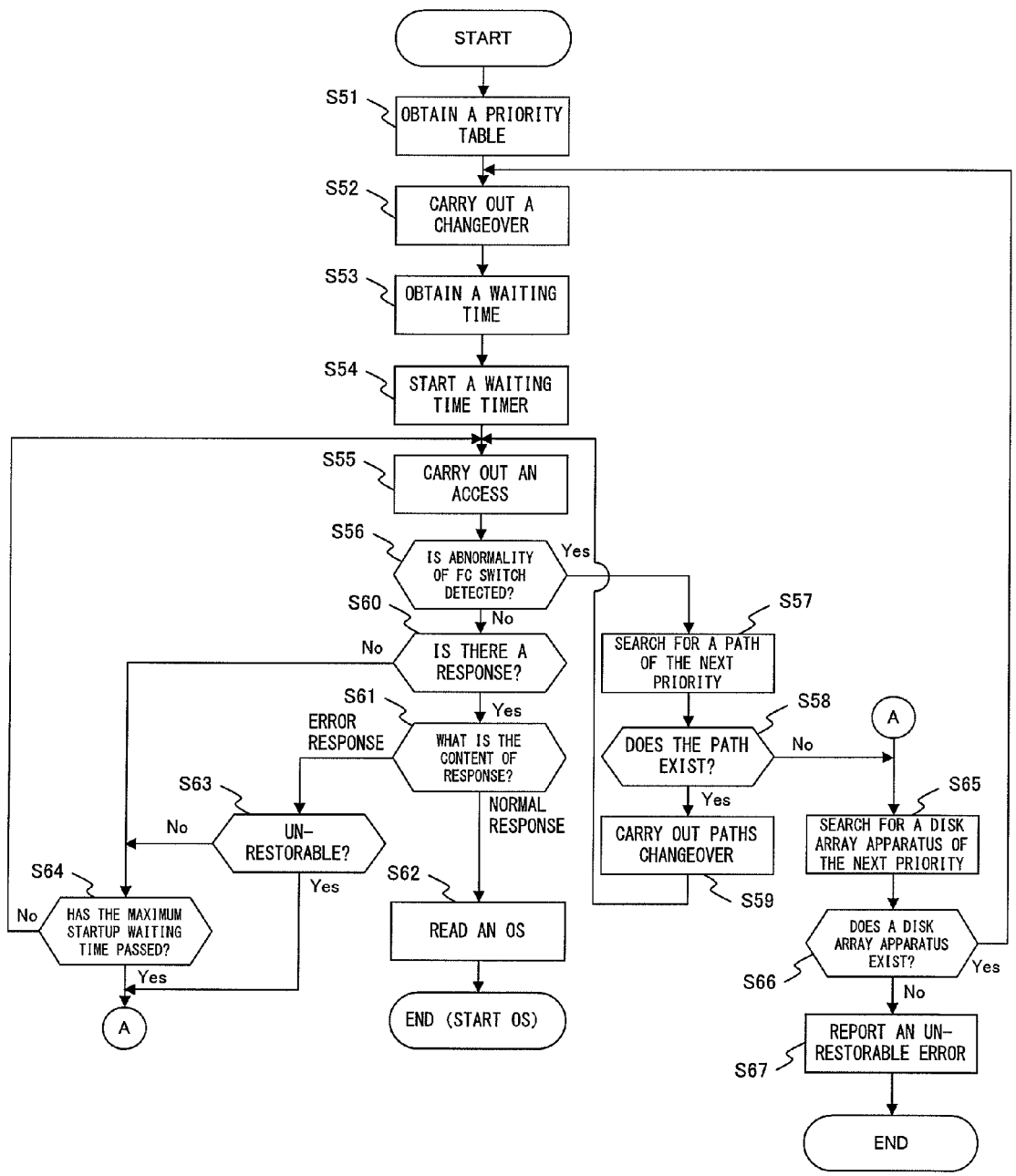
FIG. 4 is a diagram showing the content of the process of the booting process of a server apparatus 10 in a flow chart.

Next is a description of FIG. 4, which is a diagram showing the content of the process of the booting process of the server apparatus 10, which is executed by the CPU 13, in a flow chart. The process shown in FIG. 4 is implemented by the CPU 13 reading, and executing, the firmware pre-recorded in the ROM 15.

When the power is turned on to the server apparatus 10 in concert with the power to the disk array apparatuses A31 and B32, the CPU 13 comprised in the server apparatus 10 executes an initialization process, then the execution of the booting process shown in FIG. 4 is started.

Referring to FIG. 4, in step S51 (also noted as "S51" hereinafter) the process for obtaining a boot changeover priority table is carried out.

FIG. 5 exemplifies a boot changeover priority table. This table shows, for each disk array apparatus, information indicating the degree of priority in selecting the address for an access in order to read an OS image from the disk array apparatuses A31 or B32. Note that the table is pre-stored in the ROM 15.

In the example shown in FIG. 5, the table indicates items, i.e., the priority degree of access destination selection, the information for specifying an FC card to be used for access, the information of a target identifier, the FC interface-specific information of each disk array apparatus, the maximum startup waiting time of each disk array apparatus, and the path information.

Among these items, the target identifier is the information for identifying a disk array apparatus on the OS, and the FC interface specific information is the information for identifying a disk array apparatus on an FC interface. In the example shown in FIG. 5, "0" is assigned to the disk array apparatus A31 as the target identifier (shown in FIG. 2), and "0x50000000 0e000001", that is, a World-Wide Port Name (WWPN), is assigned thereto as the FC interface specific information. Further, "1" is assigned to the disk array apparatus B32 (shown in FIG. 2) as the target identifier, and "0x50000000 0e000002", that is, a WWPN, is assigned as FC interface specific information.

Further, the path information is information for indicating a selection of a repeater (i.e., an FC switch A21 and an FC switch B22) to be used for an access.

The administrator of the computer system sets the above described various pieces of information in the boot changeover priority table, and is thereby enabled to easily manage the sequence of selecting access destinations, the maximum waiting time for each disk array apparatus, the access path to the access destination, and the like.

Returning to the description of FIG. 4, in step S52 the process is carried out for changing over the setup processes for gaining access (i.e., changing over the setup of the disk array apparatuses as the access destination and that of the repeaters to be used for the access) in order to read an OS on the basis of the priority indicated in the boot changeover priority table.

In step S53 the process is carried out for obtaining the maximum waiting time for a disk array apparatus that is the post-change access destination from the boot changeover priority table.

In step S54 the process is carried out for starting the timer for measuring the time of the startup waiting time of the disk array apparatus.

Step S55 carries out the process for controlling the FC card indicated in the boot changeover priority table and for performing the access for reading an OS to the disk array apparatus that is the presently designated access destination by way of the presently designated FC switch.

The FC switches A21 and B22 transfer the received access to the addressed disk array apparatus. If the FC switches A21 and B22, however, detect an abnormality in operation (i.e., an abnormality precluding the transfer of the access) of themselves in this event, the switches return an error response to the server apparatus 10.

The disk array apparatuses A31 and B32 return information indicating a normal response if they have already completed the self initialization processes and shifted to an accessible state (i.e., a ready state) when receiving the access from the FC switches A21 or B22. In this event, if they have already completed the self-initialization processes and shifted to a state enabled to send an OS image, they return a normal response. Alternatively, if they have not yet completed the self-initialization process and have not shifted to a state enabled to send an OS image, they return response information indicating an error response to the server apparatus 10. In this case, the disk array apparatuses A31 and B32, however, become ready to be able to send an OS image upon completion of the initialization process, and therefore return what is defined as a restorable error as the error response. Alternatively, if they detect an important error (e.g., an abnormality precluding sending out an OS image due to a hardware failure or the like) in terms of the operation of the apparatuses themselves as a result of the initialization process in this event, they send response information indicating an error response to the server apparatus 10. This error response, however, returns what is defined as a fatal error (meaning an "un-restorable error").

Note that there are cases of the FC switches A21 and B22, and the disk array apparatuses A31 and B32, being unresponsive (i.e., not returning any data) to an attempt to access if they themselves are operating abnormally.

When the response information indicating an error response is sent from the FC switch A21 or B22, or from the disk array apparatuses A31 or B32, the FC card α11 or FC card β12 comprised in the server apparatus 10 receives the error response and hands it to the CPU 13.

In step S56, the process is carried out for judging whether or not an abnormality in the FC switch A21 or B22 has been detected by receiving, for example, an error response, or by the passage of a predetermined time with no response. If the aforementioned abnormality is detected (i.e., the judgment result is "yes") in this event, the process proceeds to S57, while if the aforementioned abnormality is not detected (i.e., the judgment result is "no"), the process proceeds to S60.

In step S57 the process is carried out for searching for the FC switch corresponding to a path that is next in priority to the present path in order to find a detour of the path to the presently designated access destination.

In S58 the process is carried out for judging whether or not an FC switch corresponding to the path that is next in priority exists in the boot changeover priority table. If such a switch is judged to exist (i.e., the judgment result is "yes") in this event, the process proceeds to S59 in which the process for changing over the designation of the path to the destination of an access for reading an OS to a path going through the FC switch is carried out, and then the process returns to S55 in which an access process utilizing the present post-changeover path is carried out. In contrast, if such a switch is judged to not exist (i.e., the judgment result is "no"), the process proceeds to S65.

In S60 the process is carried out for judging whether or not the FC switch has received the response information corresponding to the access performed in S55. If any kind of information is judged to be received in this event (i.e., the judgment result is "yes"), the process proceeds to S61, while if it is judged to be not received (i.e., the judgment result is "no"), the process proceeds to S64.

In S61 the process is carried out for discerning the content of the received response information. If the received information is a normal response from the disk array apparatuses A31 or B32 in this event, the process proceeds to S62. In contrast, if the received information is an error response, the process proceeds to S63.

In S62 the process is carried out for reading an OS image sent from disk array apparatuses A31 or B32 subsequent to the normal response. The CPU 13 ends the booting process when completing the process and then starts the initialization process for the OS.

In S63 the process is carried out for judging whether or not the received error information is defined as un-restorable. If the received error information is judged to be defined as un-restorable (i.e., the judgment result is "yes") in this event, the process proceeds to S65. In contrast, if the received error information is judged to be defined as restorable (i.e., the judgment result is "no"), the process proceeds to S64.

In S64 the process is carried out for judging whether or not the time measurement value measured by the timer started by the process of the above described S54 has passed the maximum start waiting time obtained by the process of S53. If the time measurement value is judged to have passed the maximum start waiting time (i.e., the judgment result is "yes") in this event, this is regarded as the occurrence of an un-restorable abnormality in the disk array apparatus, which is the destination of access, and the process proceeds to S65. In contrast, if the time measurement value is judged to not have passed the maximum start waiting time (i.e., the judgment result is "no"), the process returns to S55 in which the process is repeated for accessing, in order to read an OS and by way of the presently designated FC switch, a disk array apparatus that is the presently designated access destination.

In S65 the process is carried out for searching the boot changeover priority table for a disk array apparatus that is next level priority to the presently designated access destination.

In S66 the process is carried out for judging whether or not a disk array apparatus of the next level priority exists in the boot changeover priority table in the process of the above described S65. If such a disk array apparatus is judged to exist (i.e., the judgment result is "yes") in this event, the process returns to S52 in which the process for changing over the designation of the destination of access for reading an OS to the disk array apparatus is carried out. In contrast, if such a peripheral apparatus is judged to not exist (i.e., the judgment result is "no"), the process proceeds to S67 in which the process for outputting the information indicating the occurrence of an un-restorable abnormality to the output apparatus 17 is carried out in order to report the information to the administrator, and then the booting process ends.

The process described so far is the booting process.

Next is a description of how the server apparatus 10 waits for startup of disk array apparatuses A31 and B32 by carrying out the above described booting process in the computer system shown in FIG. 2. Note that the following is described on the assumption that the server apparatus 10 is provided with the boot changeover priority table exemplified in FIG. 5.

FIG. 6 shows a first example of how the process at the startup of the computer system shown in FIG. 2 progresses. Note that the first example shows a case in which the entirety of the computer system shown in FIG. 2 operates normally.

Referring to FIG. 6, process (A) shows the progress of the process at the server apparatus 10, while process (B) shows the progress of the process at a disk array apparatus A31.

When turning on the power supply to the computer system shown in FIG. 2, the power is turned on to the server apparatus 10 in S100, and, in concert with this, the power is turned on to the disk array apparatus A31 as well. This prompts the start of the execution of an initialization process in the server apparatus 10 in S110 and parallelly the start of the execution of an initialization process in the disk array apparatus A31.

Then, the CPU 13 of the server apparatus starts executing the booting process shown in FIG. 4 in S120. This prompts the execution of the processes from S51 through to S55 shown in FIG. 4. As a result, the setup information on the first row of the boot changeover priority table shown in FIG. 5 is obtained and an access to the disk array apparatus A31 for reading an OS is carried out, which is shown as S121-1.

Since the disk array apparatus A31 is in the midst of carrying out the initialization process (in S120) in this event, it returns an error response, shown as S211-1, in response to the access in S121-1. Note that the error response returned in this event is defined as restorable.

Meanwhile, the server apparatus 10 detects an abnormality in neither FC switch A21 nor FC switch B22, and therefore the judgment result of S56 shown in FIG. 4 is "no" and the process proceeds to S60. In this event, the server apparatus 10 receives the error response in S211-1, and therefore the process of FIG. 4 proceeds to S60, S61, S63 and S64. Here, the maximum startup waiting time ta (i.e., ten minutes in accordance with the boot changeover priority table shown in FIG. 5) of the disk array apparatus A31 has not passed yet, as shown in FIG. 6, and therefore the judgment result of S64 (shown in FIG. 4) is "no" and the process proceeds to S55. As a result, an error suppression (i.e., ignoring the obtained error response) shown as S122-1 (in FIG. 6) is put in place, and another access (shown as S121-2) to the disk array apparatus A31 for reading an OS is carried out by performing a retry shown as S123-1.

Also in this event, however, the disk array apparatus A31 is still in the midst of executing the initialization process in S210, and therefore it returns an error response (i.e., the same as in S211-1), shown as S211-2, in response to the access in S121-2.

At the server apparatus 10 in this event, the judgment result of S56 (shown in FIG. 4) is "no" and the process has accordingly proceeded to S60. Here, the server apparatus 10 receives the error response in S211-2, and the process of FIG. 4 proceeds to S60, S61, S63 and S64. Also, at this point in time, the maximum startup waiting time ta of the disk array apparatus A31 has not passed, and therefore the judgment result of S64 shown in FIG. 4 is "no" and the process accordingly returns to S55. As a result, at the server apparatus 10, the error suppression shown as S122-2 in FIG. 6 is put in place, and another access (shown as S121-3) to the disk array apparatus A31 for reading an OS is carried out by performing a retry, shown as S123-2.

In this event, the disk array apparatus A31 has advanced the process to S220 by completing the execution of the initialization process in S210 and is thus in a ready state (i.e., the state enabled to receive an access from the server apparatus 10). Therefore, in S221, the disk array apparatus A31 returns a normal response back to the server apparatus 10 in response to the present access in S121-3 and also subsequently sends the OS image to the server apparatus 10. As such, the server apparatus 10 continuing a repetition of accesses enables the disk array apparatus A31 to return a normal response quickly upon completion of the initialization process.

At the server apparatus 10, the judgment result of S56 shown in FIG. 4 is "no" and the process has proceeded to S60 in this event. Here, the server apparatus 10 receives a normal response in S221 and the process shown in FIG. 4 proceeds to S60, S61 and S62. That is, the progress of the process prompts a normal response to be validated, which is shown as S124 in FIG. 6, and the OS image sent from the disk array apparatus A31 to be read, which is shown as S125. Upon completing the reading, the server apparatus 10 shifts the process to S130 upon completion of the execution of the booting process shown in FIG. 4, and starts the startup process of the OS. Thus, a series of startup processes is completed.

As described above, the present embodiment is configured to start the startup process of the OS (S130) before the passage of the maximum startup waiting time ta of the disk array apparatus A31 as shown in FIG. 6.

Incidentally, if a normal response cannot be received from the disk array apparatus A31 even after the passage of the maximum startup waiting time ta, the judgment result of S64 shown in FIG. 4 is "yes" and the process proceeds to S65. In this event, the server apparatus 10 has judged the occurrence of an abnormality of operation in the disk array apparatus A31.

Figure 7:
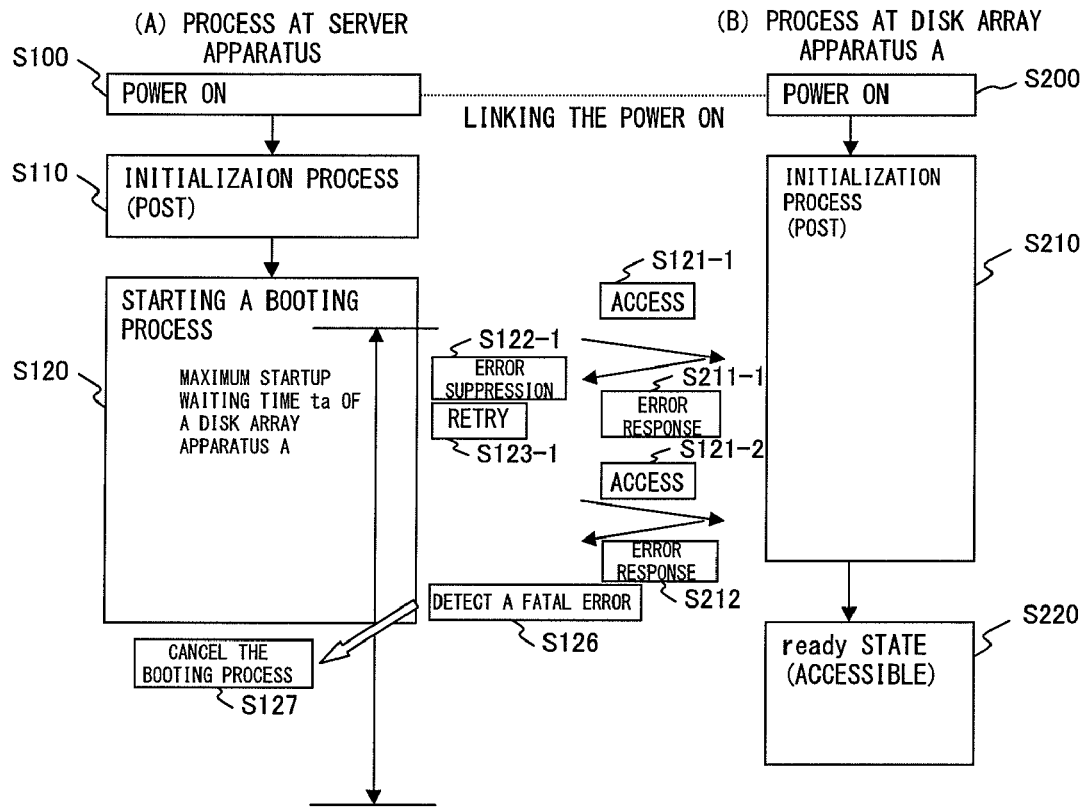
FIG. 7 is a diagram showing a second example of how the process at the startup of the computer system shown in FIG. 2 progresses.

Next is a description of FIG. 7 which shows a second example of how the process at the startup of the computer system shown in FIG. 2 progresses. Note that the second example shows the case of an un-restorable abnormality occurring in the disk array apparatus A31 of the computer system shown in FIG. 2. The assumption for the second example is that the disk array apparatus B32 for the computer system shown in FIG. 2 does not exist.

Referring to FIG. 7, process (A) shows the progress of the process at the server apparatus 10, while process (B) shows the progress of the process at a disk array apparatus A31. In FIG. 7, the flow of the processes from the start of the process until the execution of the second access to the disk array apparatus A31 for reading an OS shown as S121-2 is the same as that of the first example and therefore the description is not provided here.

If an un-restorable abnormality is detected due to the execution of the initialization process in S210, the disk array apparatus A31 sends an error response, shown as S212, in response to the access in S121-2. The error response, however, sends back what is predefined as an un-restorable access error (i.e., a Fatal Error).

In this event, the judgment result of S56 shown in FIG. 4 is "no" and the process has proceeded to S60 at the server apparatus 10 in the midst of the CPU 13 carrying out the booting process shown in FIG. 4. Here, the server apparatus 10 receives the error response in S212, and therefore the process of FIG. 4 proceeds to S60, S61, S63 and S65. This prompts the detection of an un-restorable access error, shown as S126 in FIG. 7, and then the process for searching the boot changeover priority table for a disk array apparatus of the next level priority subsequent to the presently designated access destination is carried out. According to the present example, however, the only disk array apparatus existing in the computer system is the disk array apparatus A31, and therefore the judgment result of S66 is "no", and hence the process proceeds to S67. As a result, the process for outputting information indicating the occurrence of an un-restorable abnormality in the disk array apparatus A31 and for reporting the information to the system administrator is carried out. Then, the booting process ends, which is shown as S127 in FIG. 7.

As described above, the present example is configured to cancel (in S127) the booting process before the passage of the maximum startup waiting time ta of the disk array apparatus A31, as shown in FIG. 7.

Figure 8:
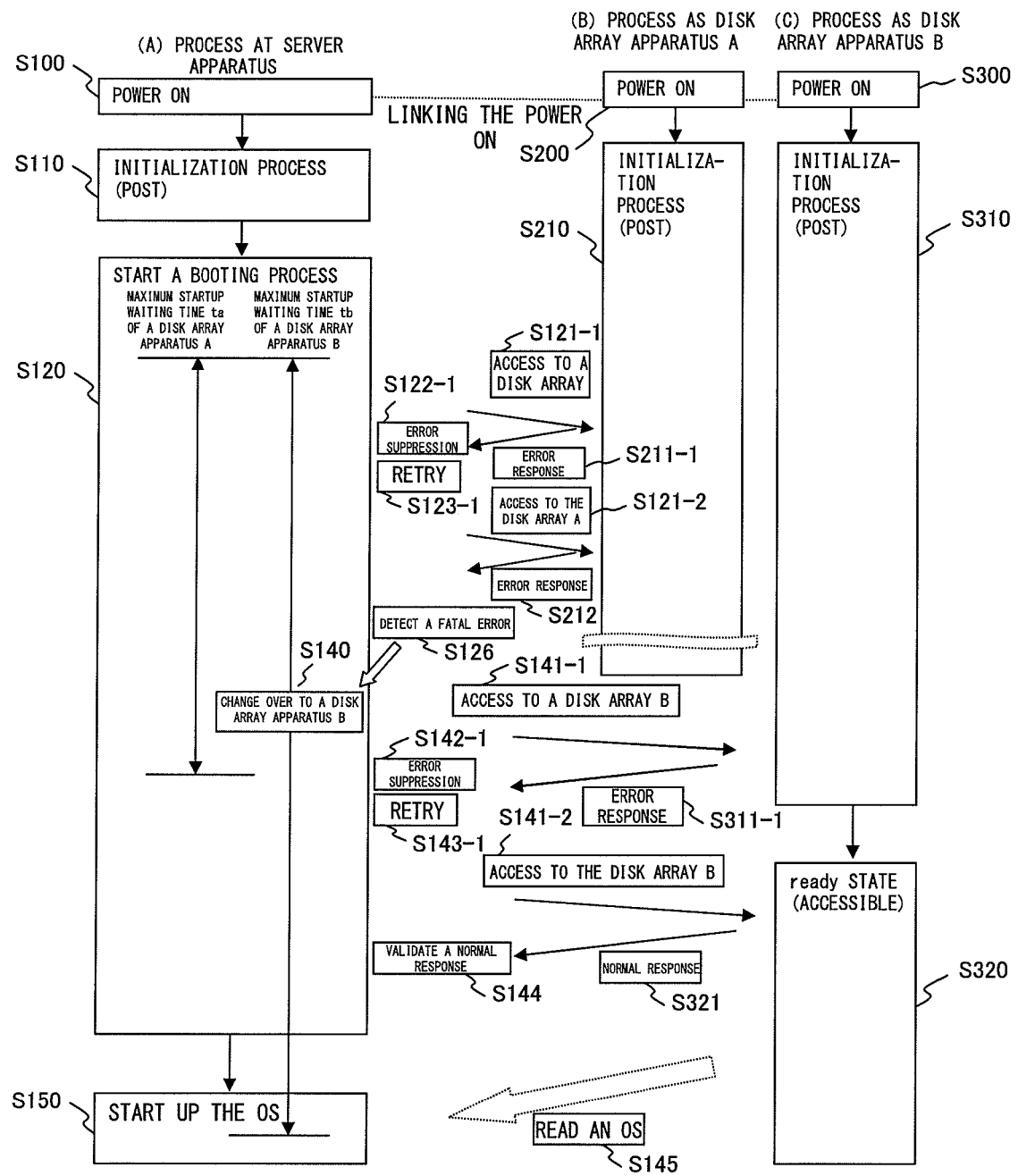
FIG. 8 is a diagram showing a third example of how the process at the startup of the computer system shown in FIG. 2 progresses.

Next is a description of FIG. 8 that shows a third example of how the process at the startup of the computer system shown in FIG. 2 progresses. Note that the third example shows the case of an un-restorable abnormality occurring in the disk array apparatus A31 in the computer system shown in FIG. 2. Also, the assumption for the third example is that the disk array apparatus B32 exists in the computer system shown in FIG. 2.

Referring to FIG. 8, process (A) shows the progress of the process at the server apparatus 10, process (B) shows the progress of the process at the disk array apparatus A31, and process (C) shows the progress of the process at the disk array apparatus B32.

In FIG. 8, the flow of the processes between the start of the process (i.e., the power on to the server apparatus 10 in S100 and, in concert with this, the power on to the disk array apparatus A31 in S200 and the power on to the disk array apparatus B32 in S300) and the detection of an un-restorable access error shown as S126 is the same as that of the second example shown in FIG. 7 and therefore the description is not provided here.

When an un-restorable access error is detected in S126, the process for searching the boot changeover priority table for a disk array apparatus of the next level priority subsequent to the presently designated access destination resulting from the execution of S65 shown in FIG. 4 is carried out. In the present example, the process discerns the existence of the disk array apparatus B32, and therefore the judgment result of S66 is "yes" and the process returns to S52. This prompts the execution of the processes from S53 through to S55, thereby changing the access destinations. As a result, an access for reading an OS is carried out to the disk array apparatus B32 as the post-change access destination in S141-1 shown in FIG. 8.

As described above, the present example is configured to change over (in S140) to the disk array apparatus B32 of the access destination before the passage of the maximum startup waiting time ta of the disk array apparatus A31, as shown in FIG. 8.

In this event, the disk array apparatus B32 shifts the process to S320, in which the apparatus is in the ready state (i.e., ready to receive an access from the server apparatus 10), upon completion of the execution of the initialization process in S310. Therefore, in response to the access in S141-1, the disk array apparatus B32 returns, in response to the present access, a normal response to the server apparatus 10 and also subsequently sends the OS image to the server apparatus 10.

At the server apparatus 10, the judgment result of S56 (FIG. 4) is "no" and the process has proceeded to S60 in this event. Here, since the server apparatus 10 receives a normal response in S321, the process shown in FIG. 4 proceeds to S60, S61 and to S62. That is, the progress of the process causes the normal response to be validated as shown as S144 in FIG. 8 and subsequently the OS image sent from the disk array apparatus B32 to be read in S145 is also shown in FIG. 8. Upon completion of the reading, the server apparatus 10 completes the execution of the booting process shown in FIG. 4, shifts the process to S150, and starts the startup process of the OS. Thus, a series of startup processes is completed.

As such, the present example is configured to enable the server apparatus 10 to read the OS image from the disk array apparatus B32, even when an un-restorable abnormality of operation occurs in the disk array apparatus A31, thereby enabling a smooth startup of the computer system.

Further, the present example is configured to start the startup process of the OS (in S150) prior to the passage of the maximum startup waiting time tb (i.e., twenty minutes in the case of the boot changeover priority table shown in FIG. 5) of the disk array apparatus B32, as shown in FIG. 8.

Next is a description of FIG. 9 which shows a fourth example of how the process at the startup of the computer system shown in FIG. 2 progresses. Note that the fourth example shows a case in which an abnormality of operation occurs in the FC switch A21 of the computer system shown in FIG. 2.

Referring to FIG. 9, process (A) shows the progress of the process at the server apparatus 10, process (B) shows the progress of the process at the disk array apparatus A31, process (C) shows the progress of the process at the FC switch A21, and process (D) shows the progress of the process at the FC switch B22.

When turning on the power to the computer system shown in FIG. 2, the power to the server apparatus 10 is turned on in S100 and, in concert with this, the power to the disk array apparatus A31 is also turned on in S200. This prompts the execution of the initialization process to be started at the server apparatus 10 in S110 and in parallel the execution of the initialization process to also be started at the disk array apparatus A31 in S210.

Subsequently, the CPU 13 comprised in the server apparatus 10 starts the execution of the booting process shown in FIG. 4. This prompts, first, the processes of S51 through S55, which are shown in FIG. 4, to be carried out. As a result, the setup information on the first row of the boot changeover priority table shown in FIG. 5 is obtained and an access to the disk array apparatus A31 for reading an OS is carried out, which is shown as S161-1. Note that this access is carried out by using the FC card α11 and by way of the FC switch A21 in accordance with the path information of the boot changeover priority table.

However, an abnormality of operation has occurred in the FC switch A21 as described above. Therefore, in response to the access in S161-1, the FC switch A21 returns an error response or no response, shown as S400-1. In this event, the FC card α11 performs error suppression in S162-1 in response to the error response, while retrying the access that is shown as 161-2. The FC switch A21, however, returns an error response or no response (in S400-2), also in response to the access of S161-1.

After repeating the above described accesses for a predetermined number of times, the FC card α11 carries out the process of retry-out (in S163) and reports, to the CPU 13, which is in the midst of executing the booting process, that the abnormality of operation has been detected in the FC switch A21.

At the server apparatus 10, the aforementioned report causes the judgment result of S56 (FIG. 4) to be "yes". This prompts the process to proceed to S57 and the process for searching for an FC switch corresponding to the path of the next level priority subsequent to the present path in order to find a detour for the path to the presently designated access destination. When the existence of the FC switch B22 is recognized by virtue of this process, the judgment result of S58 becomes "yes", so that the process for changing over the path setup for an access to the FC switch A21 to a path going by way of the FC switch B22 is carried out in S59. At the server apparatus 10, this process causes a changeover of cards, as shown in S164, so that the FC card to be used for the access is changed from the FC card α11 to the FC card β12.

Subsequently, the process of FIG. 4 returns to S55. As a result, an access to the disk array apparatus A31 for reading an OS is carried out in S165-1. Note that the access is carried out by using the FC card β12 and by way of the FC switch B22.

The normally functioning FC switch B22 returns a normal response (in S500) in response to the access of S165-1. Having received the normal response, the server apparatus 10 recognizes the judgment result of S56 (shown in FIG. 4) as "no" and shifts the process to S60.

Thereafter, the flow of processes is the same as that of the first example shown in FIG. 6 and therefore the description is not provided here.

As described above, the present example is configured to enable the server apparatus 10 to read the OS image of the disk array apparatus A31 by way of the detour utilizing the FC switch B22, even when an abnormality of operation has occurred in the FC switch A21, thereby making it possible to start up the computer system smoothly.

The preferred embodiments of the present invention have thus far been described; however, the present invention can be improved and/or changed in various ways possible within the scope thereof, in lieu of being limited to the individual embodiments described above.

According to the above described embodiments, a central processing apparatus for use in a computer system may comprise the present central processing apparatus and a plurality of external storage apparatuses comprises an access unit for accessing a specific target among the external storage apparatuses in order to read an operating system; a response information obtainment unit for obtaining response information sent from the external storage apparatus in response to the access; and an access control unit for changing the address of the access to that of an external storage apparatus that is different from the sender of response information by controlling the access unit and then making the access unit access the present post-change address if the present response information obtained from the response information obtainment unit is a predefined specific access error.

This configuration enables the central processing apparatus to read an operating system from another external storage apparatus and thereby the computer system can be started up smoothly.

Note that the central processing apparatus according to the above described embodiments may further comprise a priority degree storage unit storing degree-of-priority information in which a degree of priority in selecting the address of the access is shown for each of the external storage apparatuses, wherein the addresses of the access are changed on the basis of the degree of priority.

This configuration enables an administrator of the computer system to easily manage the sequence of selecting access destinations.

Further, the central processing apparatus according to the above described embodiments may further comprise a report unit for reporting the specific access error if all pieces of response information obtained by the response information obtainment unit from all of the external storage apparatuses are the specific access errors.

This configuration enables an administrator of the computer system to quickly grasp the fact that the above described abnormality has occurred in all of the external storage apparatuses.

Further, the central processing apparatus according to the above described embodiments may also be configured such that the access unit repeats the accesses until the response information obtainment unit obtains the response information and also continues the repetition of the present access if obtained response information is an error that is different from the specific access error even when the present response information obtainment unit has obtained the present response information.

This configuration enables, for example, an external storage apparatus to accept the above described access immediately after a busy state is eliminated if the obtained response information is only the information indicating that the external storage apparatus is in the busy state due to the execution of a self-initialization process.

Further, in this case, the present access unit may also be configured to continue the repetition of the present access until the passage of a predetermined waiting time.

This configuration makes it possible to judge an abnormality in operation of an external storage apparatus using the passage of the predetermined waiting time.

Further, in this case, the central processing apparatus may further comprise a waiting time information storage unit for storing the information of the predetermined waiting time for each of external storage apparatuses that has one of the addresses of the access.

This configuration enables an administrator of the computer system to easily manage the setup of a predetermined waiting time designated for each external storage apparatus.

Further, in this case, the access control unit may also be configured to make the access unit stop the repetition of the access temporarily even before the passage of the predetermined waiting time, change the address of the access, and then restart the access if response information obtained by the response information obtainment unit is a predefined specific access error.

This configuration makes it possible to judge an abnormality in operation of an external storage apparatus without waiting for the passage of the predetermined waiting time and to quickly change the access destinations.

Further, in this case, the access control unit may also be configured to make the access unit stop the repetition of the access temporarily even before the passage of the predetermined waiting time, change the address of the access, and then restart the access if the response information obtainment unit obtains none of the response information until the passage of the predetermined waiting time.

Further, the central processing apparatus according to the embodiments, in which the central processing apparatus is connected, by way of a repeater, to the external storage apparatuses so as to constitute a storage area network, may also be configured such that the central processing apparatus further comprises: a repeater access unit for accessing the repeater; a repeater response information obtainment unit for obtaining repeater response information sent from the repeater in accordance with an access to the repeater; and a repeater access control unit for changing the address of an access to the repeater to a repeater that is different from the sender of repeater response information by controlling the repeater access unit so as to make it access the present post-change repeater if the repeater response information obtained by the repeater response information obtainment unit is a predefined specific access error.

This configuration enables the central processing apparatus to put up a path for reading an operating system from an external storage apparatus by way of a detour circuit utilizing a repeater even if an abnormality in operation precluding a self restoration, such as a failure in hardware, occurs in one of the repeaters, thereby making it possible to start up the computer system smoothly.

Further, in this case, the present access control unit may also be configured to control the access unit so as to change the path of the access to a path including along its length a repeater that is different from the sender of repeater response information and to perform the present access by way of the present post-change path if the present repeater response information obtained by the repeater response information obtainment unit is a predefined specific access error.

This configuration enables the central processing apparatus to put up a path for reading an operating system from an external storage apparatus by way of a detour circuit utilizing a repeater even if an abnormality in operation precluding a self restoration, such as a failure in hardware, occurs in one of the repeaters, thereby making it possible to start up the computer system smoothly.

Further, in this case, the central processing apparatus may further comprise a path priority degree storage unit for storing path priority degree information that indicates a degree of priority in the path of the access for each of the external storage apparatuses, wherein the paths of the access are changed on the basis of the degree of priority in the path.

This configuration enables an administrator of the computer system to easily manage the sequence of selecting access paths.

What is claimed is:

1. A central processing apparatus for use in a computer system which comprises the present central processing apparatus and a plurality of external storage apparatuses, comprising:

an access unit which accesses a specific target among the external storage apparatuses in order to read an operating system;

a response information obtainment unit which obtains response information sent from the external storage apparatuses in response to the access; and an access control unit which changes the address of the access to that of an external storage apparatus that is different from the sender of response information by controlling the access unit and which then makes the access unit access the present post-change address if the present response information obtained from the response information obtainment unit is a predefined specific access error, wherein the access unit repeats the accesses until the response information obtainment unit obtains the response information and also continues the repetition of the present access until a passage of a predetermined waiting time if obtained response information includes an error which is different from the specific access error even in case the response information obtainment unit has obtained the present response information, and the access control unit makes the access unit stop the repetition of the access temporarily even before the passage of the predetermined waiting time, change the address of the access, and then restart the access if response information obtained by the response information obtainment unit includes the predefined specific access error.

2. The central processing apparatus according to claim 1, further comprising a priority degree storage unit which stores degree-of-priority information in which a degree of priority in selecting the address of said access is shown for each of said external storage apparatuses, wherein the addresses of the access are changed on the basis of the degree of priority.

3. The central processing apparatus according to claim 1, further comprising a report unit which reports said specific access error if all pieces of response information obtained by said response information obtainment unit from all of said external storage apparatuses are the specific access errors.

4. The central processing apparatus according to claim 1, further comprising a waiting time information storage unit which stores the information of said predetermined waiting time for each external storage apparatuses that has one of the addresses of said access.

5. The central processing apparatus according to claim 1, wherein
said access control unit makes said access unit stop the repetition of said access temporarily even before the passage of said predetermined waiting time, change the address of the access, and then restart the access if said response information obtainment unit obtains none of said response information until the passage of said predetermined waiting time.

6. The central processing apparatus according to claim 1, in which it is connected, by way of a repeater, to said external storage apparatuses so as to constitute a storage area network, wherein the central processing apparatus further comprises:
a repeater access unit which accesses the repeater;
a repeater response information obtainment unit which obtains repeater response information sent from the repeater in accordance with an access to the repeater; and
a repeater access control unit which changes the address of an access to the repeater to a repeater that is different from the sender of repeater response information by controlling the repeater access unit so as to make it access the present post-change repeater if the repeater response information obtained by the repeater response information obtainment unit is a predefined specific access error.

7. The central processing apparatus according to claim 6, wherein said access control unit controls said access unit so as to change the path of said access to a path including along its length a repeater that is different from the sender of repeater response information and to perform the present access by way of the present post-change path if the present repeater response information obtained by said repeater response information obtainment unit is a predefined specific access error.

8. The central processing apparatus according to claim 7, further comprising
a path priority degree storage unit which stores path priority degree information which indicates a degree of priority in the path of said access for each of said external storage apparatuses, wherein
the paths of the access are changed on the basis of the degree of priority in the path.

9. A booting method for a central processing apparatus for use in a computer system which comprises the present central processing apparatus and a plurality of external storage apparatuses, comprising:

accessing a specific external storage apparatus among the external storage apparatuses in order to read an operating system;
obtaining response information sent from the external storage apparatuses in accordance with the access; and
changing the address of the access to that of an external storage apparatus that is different from the sender of response information and then making the access to the present post-change external storage apparatus if the obtained present response information is a predefined specific access error, wherein
the accessing repeats the accesses to the specific external storage apparatus until the response information is obtained and also continues the repetition of the present access until a passage of a predetermined waiting time if obtained response information includes an error which is different from the specific access error even in case the present response information has been obtained, and
if obtained response information includes the predefined specific access error, the repetition of the access is temporarily stopped even before the passage of the predetermined waiting time, the address of the access is changed, and then the accessing is restarted.

10. A non-transitory computer readable storage medium for storing a program for booting a central processing apparatus for use in a computer system which comprises the present central processing apparatus and a plurality of external storage apparatuses, wherein the program makes the present central processing apparatus perform a method comprising:
accessing a specific external storage apparatus among the external storage apparatuses in order to read an operating system;
obtaining response information sent from the external storage apparatuses in accordance with the access; and
changing the address of the access to that of an external storage apparatus that is different from the sender of response information and then making the access to the present post-change external storage apparatus if the present response information obtained by executing the processing for obtaining the response information is a predefined specific access error, wherein
the accessing repeats the accesses to the specific external storage apparatus until the response information is obtained and also continues the repetition of the present access until a passage of a predetermined waiting time if obtained response information includes an error which is different from the specific access error even in case the present response information has been obtained, and
if obtained response information includes the predefined specific access error, the repetition of the access is temporarily stopped even before the passage of the predetermined waiting time, the address of the access is changed, and then the accessing is restarted.

* * * * *